United States Patent

Yokokawa

[11] Patent Number: 5,769,921
[45] Date of Patent: Jun. 23, 1998

[54] METHOD OF PRODUCING QUARTZ GLASS BODY

[75] Inventor: Kiyoshi Yokokawa, Annaka, Japan

[73] Assignee: Heraeus Quarzglas GmbH, Hanua, Germany

[21] Appl. No.: 655,185

[22] Filed: May 30, 1996

[51] Int. Cl.$^6$ ..................................................... C03B 8/04
[52] U.S. Cl. ................................. 65/412; 65/421; 65/427
[58] Field of Search ............................. 65/421, 422, 427, 65/412

[56] References Cited

U.S. PATENT DOCUMENTS

| | | | |
|---|---|---|---|
| 4,233,052 | 11/1980 | Dominick | 65/421 |
| 4,289,517 | 9/1981 | Bailey | 65/422 |
| 4,388,094 | 6/1983 | Carpenter | 65/427 |
| 4,941,905 | 7/1990 | Narasimham | 65/421 |
| 5,221,308 | 6/1993 | Krohn | 65/417 |
| 5,352,259 | 10/1994 | Oku | 65/427 |
| 5,658,363 | 8/1997 | Ince | 65/412 |
| 5,665,132 | 9/1997 | Ruppert | 65/427 |

FOREIGN PATENT DOCUMENTS

| | | | |
|---|---|---|---|
| 4-83728 | 3/1992 | Japan | 65/421 |
| 6-48757 | 2/1994 | Japan | 65/427 |

Primary Examiner—John Hoffmann
Attorney, Agent, or Firm—Felfe & Lynch

[57] ABSTRACT

A solid or hollow cylindrical heat-resistant substrate having a tapered shape is rotated about its axis, the degree of tapering being essentially constant along the entire length. The substrate has an outer diameter in the range of 20 mm to 500 mm and a length in the range of 500 mm to 5,000 mm. A mother material body made of porous quartz glass is formed on the outer surface of the substrate by chemical deposition, and vitrified by heating while holding it vertically with the larger outer-diameter side of the heat-resistant substrate positioned downward. Alternatively the heat-resistant substrate is extracted from the mother material body and a heat-resistant tapered body with a taper similar to that of the substrate is inserted into the hole left after extraction in the central region of the mother material body. The mother material body is vitrified starting at the lower end with the larger outer-diameter side positioned downwardly. A large-sized quartz glass rod or a large-sized quartz glass tube can be provided any of which has originally an orderly shape and which therefore can be easily machined.

5 Claims, 5 Drawing Sheets

METHOD OF PRODUCING QUARTZ GLASS BODY

FIELD OF THE INVENTION

The present invention relates to a method of producing a large quartz glass body, more particularly a rod or a tube to be used as a preform for drawing optical fibers, with a high precision in dimensions.

PRIOR ART

According to conventional methods for producing a quartz glass preform for drawing an optical fiber, the following steps are commonly followed: rotating a heat-resistant substrate in the shape of a solid cylinder or a hollow cylinder each with a smooth peripheral surface about the axis; blowing a gaseous raw material together with an oxygen-hydrogen flame to form a mother material body made of porous quartz glass; and heating and vitrifying the mother material body. When the heat-resistant substrate is a quartz glass rod to be transformed to a core rod, a preform for an optical fiber is obtained in a conventional method. In another case when the heat-resistant substrate is simply a quartz glass rod, a quartz glass rod of larger size is obtained. In a further case when the heat-resistant substrate is a quartz glass tube, a quartz glass tube with a larger diameter is obtained. Further conventional methods for producing a quartz glass tube include i) forming a mother material body made of porous quartz glass on the surface of a heat-resistant substrate; vitrifying by heating the mother material body; and thereafter extracting the substrate out of the middle portion of the mother material body, and ii) extracting the heat-resistant substrate out of the mother material body after it has been produced; processing mechanically the mother material body into a desired shape and size; giving the mother material body a dehydration treatment; thereafter fittingly inserting a heat-resistant body as machined in almost the same shape as the heat-resistant substrate into a central hole of the mother material body; vitrifying by heating the mother material body together with the heat-resistant body inserted; and finally extracting the heat-resistant body from the quartz glass body obtained.

Enlargement in size, mass production and reduction in cost of a quartz glass body as well as upgrade in purity of quartz glass material, as an industrial material used in technical fields such as the semiconductor industry have progressively increased requirements in recent years. Conventionally known methods such as the OVC method (a short for the Outside Vapor-Phase Deposition Method), the MOVD method (a short for the Modified Outside Vapor-Phase Deposition Method), each of which is generally called an outer deposition method, have a common limitation in large scale use as an industrial material, since each of the outer deposition methods can provide a product per a batch only in small dimensions and small weight which amounts 10 kg to 20 kg at the largest. Since quartz material according to the outer deposition methods can be obtained with extremely high purity, the quartz material obtained is easier to dehydrate, and quartz glass having a good quality is obtainable, outer deposition methods have been drawing attention. An attempt was made to produce a large quartz glass body using a mother material body made of porous quartz glass, but the attempt ended in failure, because the mother material body was subject to breakdown due to deformation during vitrification and thereby the yield was too low to put the method to practical use.

A heat-resistant substrate of 20 mm to 500 mm in outer diameter and of 500 mm to 5,000 mm in length should be required to produce a large quartz glass body being as heavy as 10 kg to 500 kg. It is not easy to form a mother material body made of porous quartz glass on the outer surface of the above-mentioned large-sized heat-resistant substrate or to keep dimensions of the mother material body stable during vitrification. There are further problems as follows.

(1) A heat-resistant substrate having a larger diameter not only decreases an average density of a mother material body but also weakens the mechanical strength. A heat-resistant substrate having a longer length makes it easy for breakdown to occur in the mother material body starting at edge portions thereof, since the substrate shift sideways in the mid portion during rotation, receives repeated bending motions, vibration and the like in the course of a vitrification process.

(2) In a conventional method of vitrifying a mother material body made of porous quartz glass, a zone-melting technique was much used in which the mother material body was held vertically. However, with a longer substrate, vertical contraction of the mother material body occurs with lack of uniformity along the length and cracking occurs. In a worst case the cracking grows further to breakdown.

(3) When porous quartz glass is piled up on a heat-resistant substrate by means of an outer deposition method, a mother material body made of porous quartz glass has a chance of displacement due to contraction relative to the substrate during a vitrification process, since the interface portion between the heat-resistant substrate and the porous quartz glass layer is destroyed due to a difference in thermal contraction coefficient. In such a situation, bubbles are produced at the interface during vitrification and therefore homogeneity in the quartz glass deteriorates.

(4) When a heat-resistant substrate is extracted from the central portion of a mother material body made of porous quartz glass and then another heat-resistant body is inserted, a relative displacement can occur between the mother material body and the heat-resistant substrate at the interface, because the mother material body is made of more dense porous quartz glass. Though destruction or bubble production is not problematic, uniformity in dimensions of the mother material body is degraded in such a manner as to become thicker or larger in diameter in regions where mass is accumulated due to displacement, or to become thinner or smaller in diameter in regions where mass is decreased by drawing.

(5) In a process of vitrification, softening and contraction occur at the same time in the mass of a mother material body made of porous quartz glass and, if conditions permit, glass material moves locally upwardly or downwardly. The weight of the lower part can force a thermal elongation in a softened upper part (FIG. 5(a)), but in another process the weight of an upper part can cause deformation by thermal compression in a softened lower part (FIG. 5(b)).

As described above, the mother material body after vitrification receives various types of deformations, such as fluctuations in both outer diameter and inner diameter, bends or torsions along the length. In order to mechanically straighten such abnormalities in shape, the smallest outer diameter and largest inner diameter available are chosen as references in a following step (FIG. 6). If a straight tube is actually produced from a vitrified mother material body, for example, the maximum inner diameter available in light of bends and torsions is adopted as a designed inner diameter and the minimum outer diameter available is chosen as a designed outer diameter for a grinding process, so that the finished tube is larger in inner diameter with a smaller thickness. The yield of a quartz glass product is decreased, at the same time complexity of operations is enhanced, productivity is reduced, and production cost is increased.

SUMMARY OF THE INVENTION

The invention is based on the discovery that a large quartz glass body with a stable and orderly shape and size can be produced with a low cost through a process comprising the steps of: processing a heat-resistant substrate so as to have a uniform taper along the entire length; forming a mother material body made of porous quartz glass on the outer surface of the substrate; and thereafter continuously vitrifying by melting the mother material body by means of a zone melting technique while holding the mother material body vertically with the larger end of the substrate positioned downwardly.

A first method of producing a quartz glass body according to the invention includes the steps of: rotating a solid or hollow cylindrical heat-resistant substrate which has a tapered shape about its axis, the degree of tapering being essentially constant along the entire length, and which has an outer diameter in the range of 20 mm to 500 mm and a length in the range of 500 mm to 5,000 mm; forming a mother material body made of porous quartz glass on the outer surface of the substrate by blowing quartz glass fine particles onto the outer surface; and vitrifying by heating the mother material body while vertically holding the mother material body with the larger end of the heat-resistant substrate positioned downwardly.

Another method of producing a quartz glass body includes the steps of rotating a cylindrical quartz glass substrate according to the first method about its axis, and forming a mother material body made of porous quartz glass on the outer surface of the substrate by thickly piling up quartz fine glass particles on the outer surface. Thereafter the heat-resistant substrate is extracted from the mother material body and a heat-resistant tapered body with a taper similar to that of the hole in the substrate is inserted into the hole. The mother material body is upwardly vitrified by heating starting at the lower end while vertically holding the mother material body with the large end of the body positioned downwardly. When the heat-resistant substrate or the heat-resistant body is a rod or a tube made of quartz glass, a final product is a quartz glass rod or a quartz glass tube. When the heat-resistant substrate or the heat-resistant body is made of a heat-resistant material other than quartz glass, they are extracted after vitrification to produce a quartz glass tube.

It is an object of the present invention to provide a method of producing a large quartz glass body with a shape and size both being orderly.

It is another object of the present invention to provide a large quartz glass rod with a shape and size both being orderly.

It is a further object of the present invention to provide a large quartz glass tube with stable, large inner and outer diameters and a larger thickness at a low cost.

DESCRIPTION OF THE PREFERRED EMBODIMENTS

Figure 1:
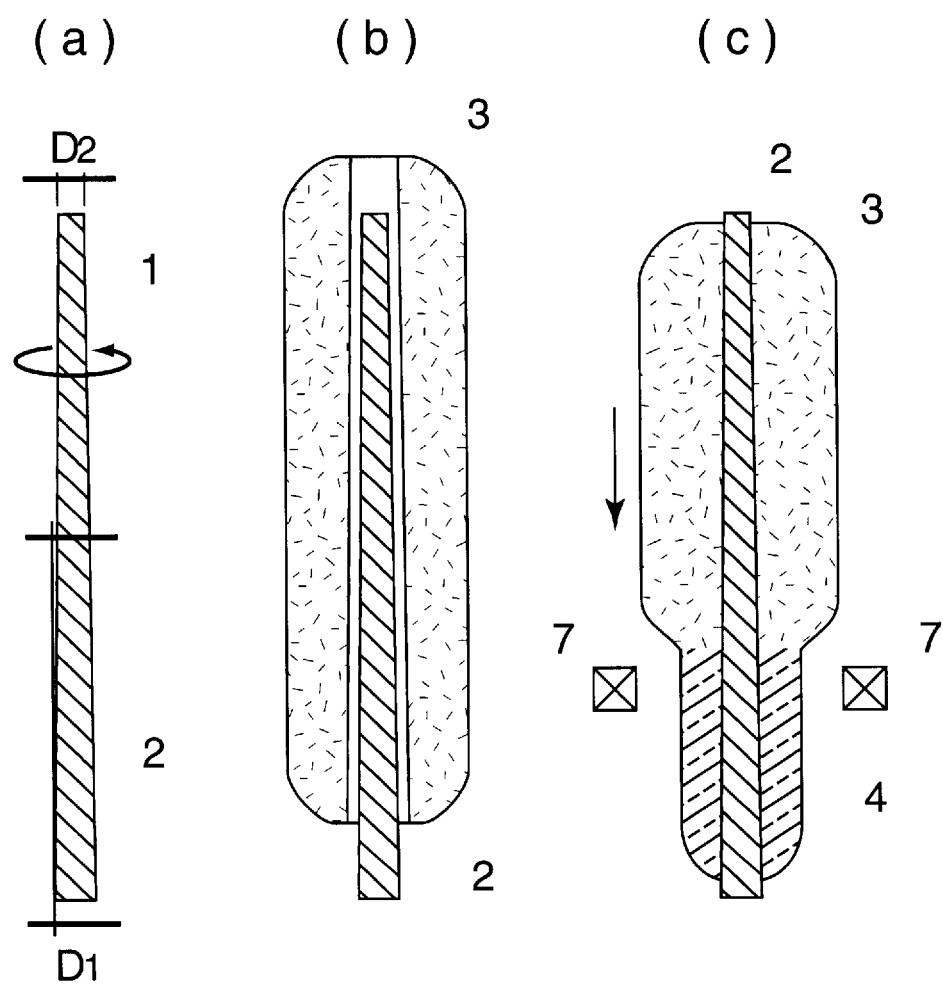
FIG. 1(a) is a schematic side view, in section, of a tapered heat-resistant substrate.
FIG. 1(b) is a schematic side view, in section, of a mother material body made of porous quartz glass inserted with the heat-resistant substrate.
FIG. 1(c) is a vertically-held mother material body made of porous quartz glass, in section, under zone melting.

As shown in FIGS. 1(a), 1(b) and 1(c), a heat-resistant substrate 1 and a heat-resistant body 2 each have an essentially uniform taper along the entire length and an outer diameter in the range of 20 mm to 500 mm and a length in the range of 500 mm to 5,000 mm. Each is made of a heat-resistant ceramic such as any selected from the group consisting of quartz glass, carbon, alumina, mullite, zirconia, silicon carbide, silicon nitride, boron nitride and the like, or alternatively only coated with any of such heat-resistant ceramics.

The following description of a heat resistant substrate on which a quartz glass body is formed, will likewise apply to a heat resistant body which may be subsequently inserted. The degree of taper is dependent on the diameter and length of a heat-resistant substrate and is preferably smaller. The best value is chosen in consideration of conditions such as the thickness and density of a mother material body made of porous quartz glass and the adhesiveness of the heat-resistant substrate. A larger taper should be generally required in the cases when (1) a heat-resistant substrate is thinner and longer, (2) the density of a mother material body made of porous quartz glass is smaller, (3) the cross-sectional area of a mother material body made of porous quartz glass is larger than the total area of the interface with a heat-resistant substrate and the weight of the mother material body is heavy, (4) the adhesiveness in the interface is lower. The lower limit of an effective taper is 0.1 mm/m. From the above description it will be apparent that a larger taper is required in the case of a lower density mother material body and heat-resistant substrate of small diameter. When the outer diameter is 20 mm at the largest part, the taper to be adopted is about 50%/m in outer diameter ratio, which ratio is defined as a per-unit-length value corresponding to the maximal difference of diameters as a percent of the largest diameter or $\{(D1-D2)/(D1 \times L)\} \times 100$, where D1 is the largest outer diameter, D2 is the smallest diameter and L is the total effective length each of the heat-resistant substrate or the heat-resistant body. When the density of the heat-resistant substrate is in the range of 0.5 g/cm$^3$ or more preferably in the range of 0.75 g/cm$^3$ or more, a chance of the displacement due to thermal contraction during the process becomes a zero even a taper as low as 0.1 mm/m. Therefore, when the diameter of the heat-resistant substrate is smaller, a taper should be in the range of 0.1 mm/m or more and an outer diameter ratio should be in the range of 50%/m or less. When the outer diameter of the heat-resistant substrate is in the range of 20 mm or smaller, a taper is a little effective, but an outer diameter in the range of 500 mm or larger of the heat-resistant substrate is not practical, since the diameter of the mother material body becomes as large as 1,000 mm to 2,000 mm, which is too large to find an actual industrial facility for production. It is naturally different in the case of production of a mother material body being in a tubular shape small in thickness. In addition, when a length of the heat-resistant substrate is in the range of 500 mm or smaller, effects of a larger quartz glass rod or a larger quartz glass tube on technology or economy is small from a viewpoint of industrial production. On the other hand, when it is in the range of 5,000 mm or larger, facilities become too expensive for a product to be costwise reasonable.

In a method according to the present invention, it is necessary to produce a mother material body made of porous quartz glass having not only a shape uniform along the entire length, but a density profile uniform at least in the axial direction. In order to produce such a mother material body, the outer deposition method can be used. In the method, fine particles of quartz glass which are blown onto the surface of a heat-resistant substrate are produced by hydrolyzing or oxidizing a volatile silicon compound such as $SiCl_4$, $SiCl_3(CH_3)$, $SiMe(OCH_3)_3$, $SiClF_3$ or the like in the flame of an oxygen-hydrogen burner. Deposition can be carried out in a manner horizontal or vertical with respect to the position of the heat-resistant substrate. In the case of production of a mother material body large in diameter and long in length, a vertical manner is preferred. A burner or a plurality of burners travel as one unit, while reciprocating, across the entire length of the heat-resistant substrate. In another case, a plurality of stationary burners can be arranged along the length of the heat-resistant substrate at a constant pitch of five or more burners per one meter. A deposition rate of porous quartz glass on the mother material body is proportional to the number of burners used at the same time. Consequently more burners are generally preferred because the productivity is higher, even if the outer diameter of a mother material body produced more or less fluctuates along the length, since outside grinding is performed on a quartz glass body thus produced. As to a suitable flame, an oxygen hydrogen flame, a plasma flame, or other flames such as propane or natural gas can be used.

It is impossible to always produce a quartz glass body of uniform shape, since the shape of the quartz glass body is influenced by conditions of vitrification by heating, even though the shape of a starting mother material body made of porous quartz glass has been uniform enough. This is mainly caused by the fact that though the density of a mother material body is in the range of 0.3 g/cm$^3$ to 1.5 g/cm$^3$ before vitrification, a volume of the mother material body is shrunken to $\frac{1}{8}$ to $\frac{1}{1.5}$ times the original after vitrification. Shrinkage occurs three-dimensionally in the bulk with a freedom which is affected by such factors as distance from a heat source, directional relation to the heat source, traveling speed of a melt zone, temperature profile along the length, temperature difference, convection in a melt bulk, and radiation loss from the surface. In the case of a mother material body larger in diameter and length, a gravitational force affects a relation between the upper side and the lower side in cooperative influences of temperature and time. Adhesiveness to the heat-resistant substrate or heat-resistant body and a resistive force against the displacement by thermal contraction influence the shape and size of a quartz glass body produced. When the density of a mother material body made of porous quartz glass is in the range of 0.3 g/cm$^3$ or less, retention of a shape of the mother material body is not stable enough, but when the density is in the range of 1.5 g/cm$^3$ or more, bubbles occur in the quartz glass body and dehydration of the mother material body is poor.

In the above-mentioned method of producing a quartz glass body, if there are not problems such as pollution by a dehydration treatment or adhesion to a mother material body made of porous quartz glass in regard to a heat-resistant substrate, the mother material body is vitrified by heating with the heat-resistant substrate held in the bulk. However, if a problem is present, vitrification is conducted after extracting the heat-resistant substrate 1 and inserting a tapered heat-resistant body 2 which is shaped by processing to fit the taper of a hole left after extracting the heat-resistant substrate, as shown in FIG. 1(b). If circumstances require, doping is conducted or a dehydration treatment is given before the insertion.

A quartz body with no special requirements of shape and size can also be produced. In a first case, a mother material body made of porous quartz glass is sliced into plates after the heat-resistant substrate is extracted and contamination on the outer and inner surfaces is removed. In a second case, the mother material body, from which the heat-resistant substrate is extracted, is vitrified and doped. Various means of dehydration are employed, for example, gas substitution, dehydration under vacuum or the like. In order to attain a quartz glass body with a uniform shape and size, a mother material body made of quartz glass with a uniform shape and size must be produced, and uniform or no contraction in the axial direction during vitrification must be realized. When a heat-resistant body is inserted after a heat-resistant substrate is extracted, displacement of the mother material body due to contraction becomes easier and thereby the body collapses under its weight, since the heat-resistant body has no adhesive force acting on the mother material body, and has only a negligible resistance, if any, against displacement of the mother material body relative to itself.

In order to stabilize a sectional shape of a large quartz glass rod or tube, it is generally preferable to vitrify a mother material body made of porous quartz glass which has a sectional shape with an axial symmetry and to position the mother material body vertically rather than horizontally. However, when a long, thick mother material body is positioned vertically, thermal contraction works upward or downward and makes displacement of the mother material body possible in any direction. There is therefore a need for devising a special structure which prevents displacement. For this purpose, it is not totally effective simply to hold fast both ends of the mother material body, since displacement occurs in the mid-portion of the mother material body if conditions for vitrification such as a zone traveling speed and a temperature profile permit. If a mother material body is held horizontally to prevent such displacement, a sectional shape of the vitrified quartz glass body may have a fault such as being axially asymmetric, though displacement in the axial direction is prevented. It can be said that holding the mother material body made of porous quartz glass horizontally during vitrification is useless.

Explanations will be given in detail on faults of vertical holding of a mother material body during vitrification. In the vertical holding, a temperature and a gravitational force become important factors. If a melt zone is shifted down, vitrification makes a vitrified portion and a part of a heat-resistant substrate or a heat-resistant body adhere to each other easily. In the course of zoning, wherein a highest temperature portion moves down, there is a chance that a thermal contraction force which acts to pull up a lower part becomes larger than the total weight of the lower part. If additionally the adhesive force acting between the lower part of the mother material body and the heat-resistant substrate or the heat-resistant body is weak, the portion at the interface is destroyed and the lower part of the mother material body lifted upwardly (FIG. 4($a$)). To the contrary, when the lower part of the mother material body is heavy or the adhesive force is strong, an upper part is pulled to displace downwardly and as a result a sectional shape in the upper part is affected (FIG. 4($b$)). If a melt zone is shifted up, in the first part of the progress a melt zone in a light lower part is pulled upward as seen from a view in FIG. 4($c$). When adhesiveness of the upper part is weak and a gravitational force acting thereon is large, local diameters of the lower part of the mother material body change irregularly (FIG. 4($d$)). At the same time the whole shape of the softened lower part which has been already vitrified is compressed under influence of the weight of the upper part. For example, the axis is bent and twisted, since the weight of the upper part comes to be received by the lower part of the mother material body during vitrification. This character is conspicuously exhibited in the production of a large quartz glass rod, where temperature and passage time are important factors.

Figure 2:
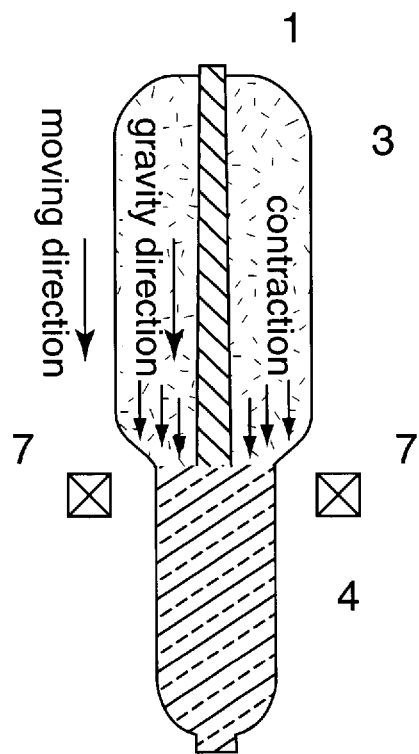
FIG. 2 is a schematic view of a mother material body made of porous quartz glass, in section, illustrating forces acting in the mass of the mother material body under zone melting.
Figure 3:
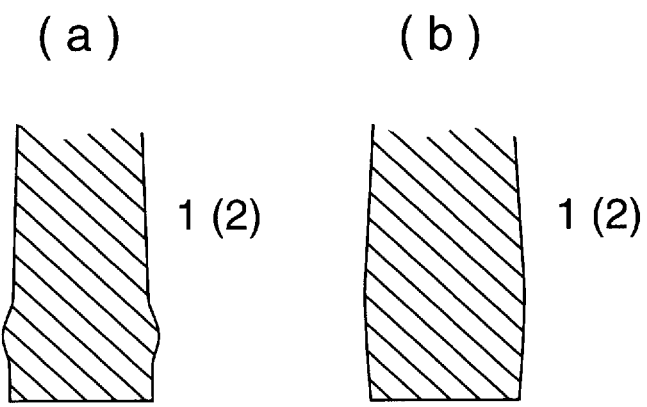
FIG. 3(a) is a schematic view, in section, of a part of a heat-resistant substrate or a heat-resistant body having a means of stopping displacement of a mother material body made of porous quartz glass under zone melting.
FIG. 3(b) is a schematic view, in section, of a part of a heat-resistant substrate or a heat-resistant body having another means of stopping displacement of a mother material body made of porous quartz glass under zone melting.
Figure 4:
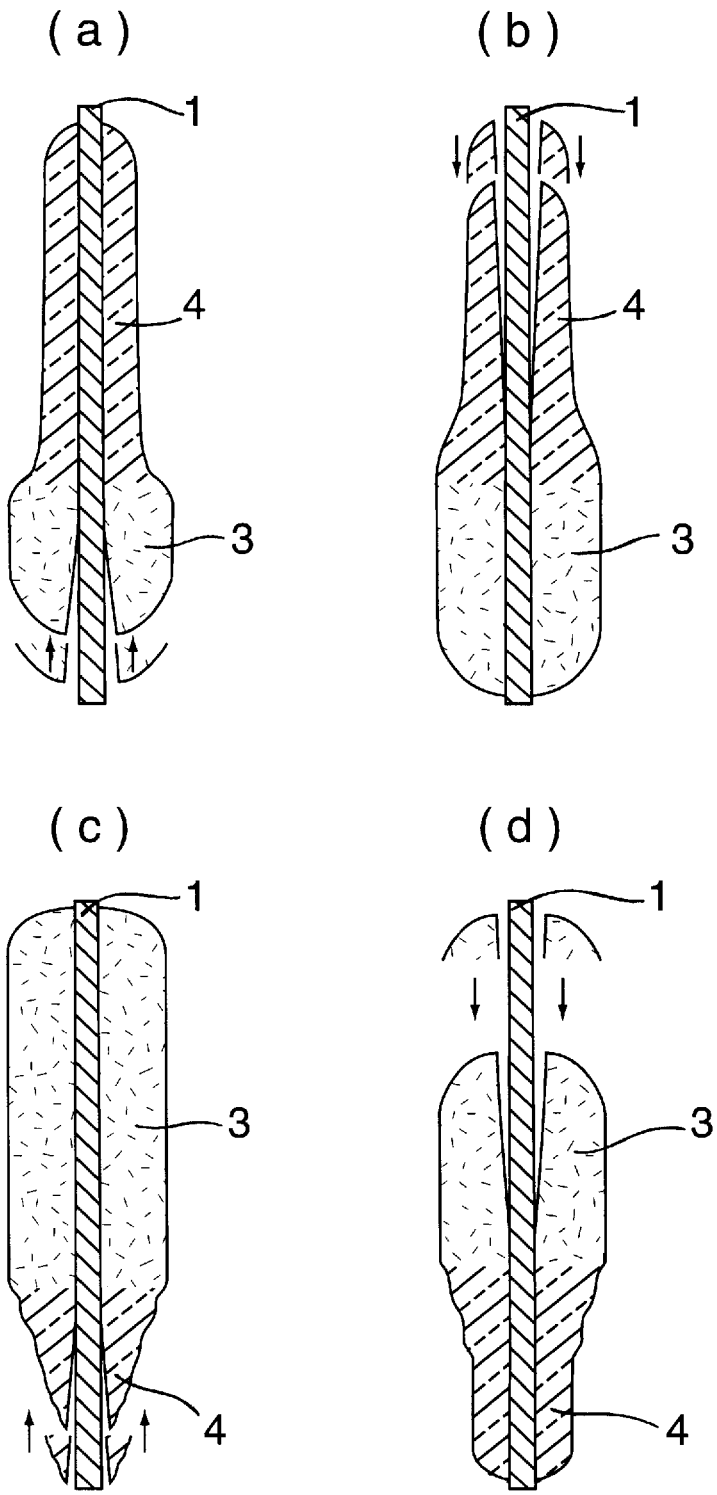
FIG. 4(a) is a schematic view, in section, of an upward displacement of the solid lowest part and an upper narrowed vitrified part of a mother material body during downward shifting of a melt zone according to a conventional technique.
FIG. 4(b) is a schematic view, in section, of a downward displacement of the softened uppermost part and an upper narrowed vitrified upper part of a mother material body during downward shifting of a melt zone according to a conventional technique.
FIG. 4(c) is a schematic view, in section, of an upward displacement of the softened lowest part and a lower narrowed vitrified part of a mother material body during upward shifting of a melt zone according to a conventional technique.
FIG. 4(d) is a schematic view, in section, of a downward displacement of the solid uppermost part and a lower narrowed vitrified part of a mother material body according to a conventional technique.
Figure 5:
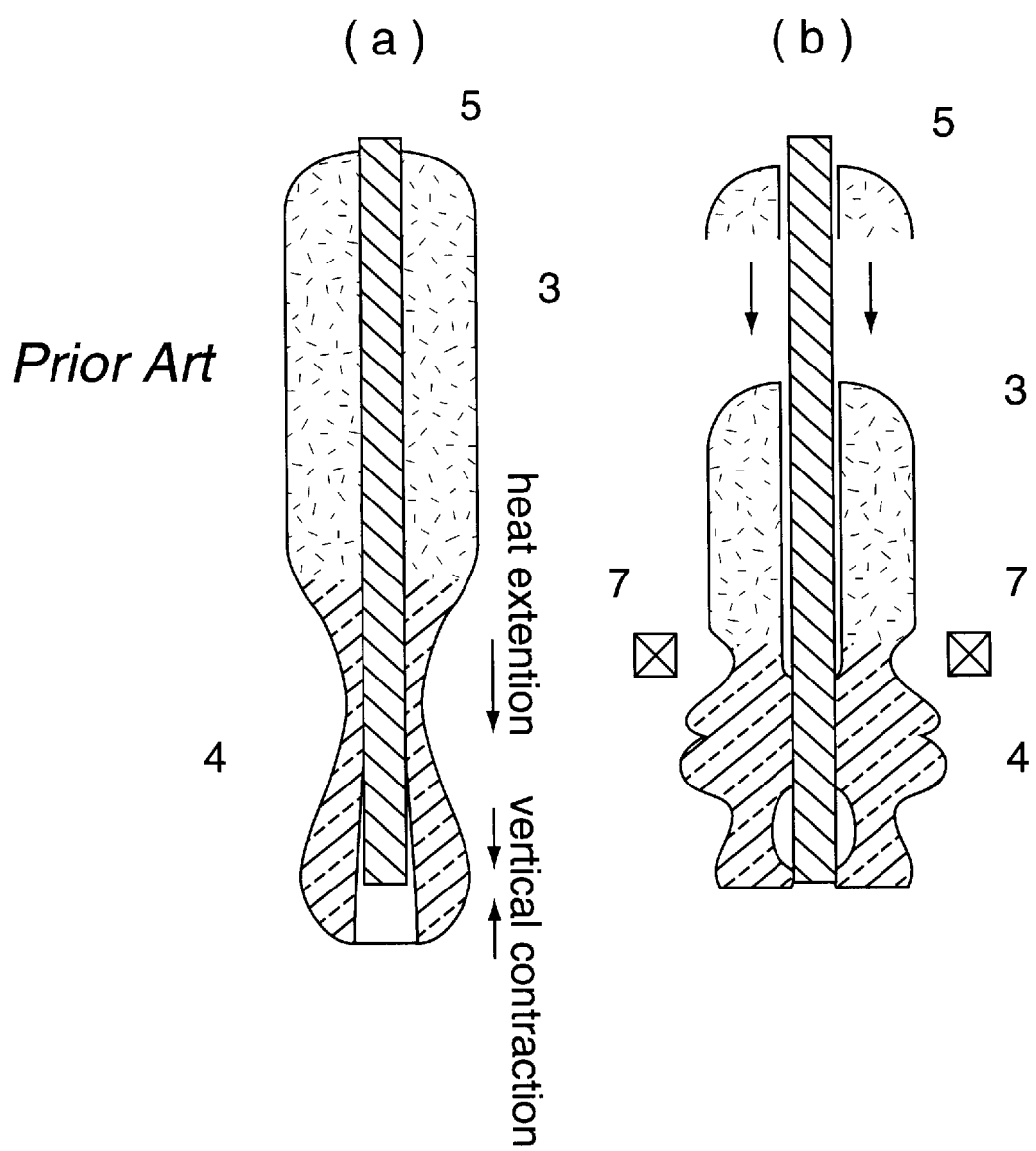
FIG. 5(a) is a schematic view, in section, of a local extension which occurs in a lower softened part during vitrification of a mother material body according to a conventional technique.
FIG. 5(b) is a schematic view, in section, of local multiple compressions which occur in a lower softened part during vitrification of a mother material body according to a conventional technique.
Figure 6:
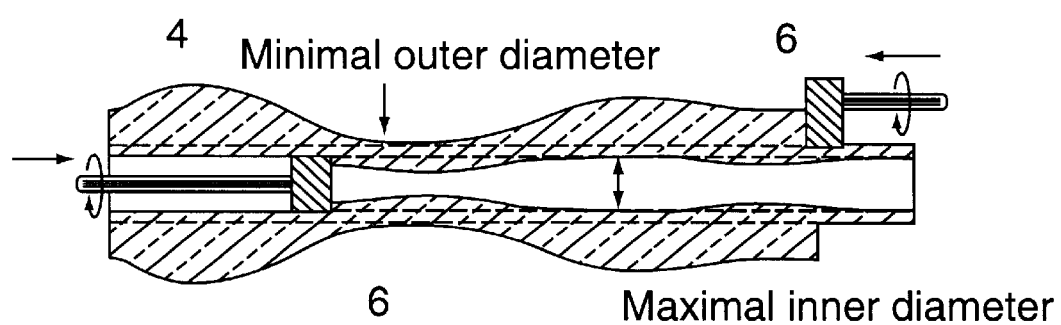
FIG. 6 is a schematic view illustrating a primary quartz glass tube vitrified from a conventional mother material body made of porous quartz glass being grinding.

According to the present invention, a mother material body made of porous quartz glass is vertically held in a process of vitrification, the directions of force of thermal contraction and gravitational force are aligned in the same downward direction, as shown in FIG. 2. Zone melting is started at the lower end so that downward displacement due to thermal contraction of a molten part of the mother material body may be attained with ease. Against an inclination of such downward displacement, the heat-resistant substrate or heat-resistant body tapers upward. To prevent upward displacement as shown in FIG. 4($c$), it is preferred to also provide a means for stopping upward displacement of the lower end, which can be easily extracted from the mother material body, such as an annular protrusion (FIG. 3($a$)) or a local inversely tapered part (FIG. 3($b$)). However, such a means for stopping is required neither when a vitrified portion of the mother material body has strong adhesion at high temperature nor when the weight of a lower part of the mother material body is heavy enough compared with the contraction force. To the contrary, when the adhesiveness is weaker compared with the contraction force, it is preferred to provide a simple structure of an inversely tapered portion in dependence on the circumstances. A value of the inverse taper is dependent on size of the mother material body and the like, as described above. Even with a slight inverse taper, requirement for adhesiveness of a vitrified portion of the mother material to the heat-resistant substrate or the heat-resistant body is much alleviated, though requirement for a taper is dependent on size of the mother material body. Therefore, conditions for producing a mother material are also relaxed. However the chance of the light lower part being pulled upwardly has a higher probability in the starting and following short period of a vitrification process.

In a zone melting process according to the present invention, the mother material body is at first placed above a heater and then lowered continuously, or a heater is at first placed under the mother material body and then shifted upwardly. In a stationary furnace, a temperature profile is moved in one direction.

A quartz glass body obtained according to the present invention has a uniform shape and size. A quartz glass plate is produced from a quartz glass rod. A quartz glass tube of a good straightness, with no fluctuations in inner and outer diameters, and no bending or torsion is produced. A quartz glass body can be ground with any of an outer peripheral grinder or an inner peripheral grinder each of which is used for grinding general industrial materials. In the case of a green quartz glass tube with an even inner taper along the length of a hole, a shorter processing time is required to shape the tube into a product of desired dimensions, since a load in grinding on an inner peripheral grinder is almost constant along the entire length of the hole and the axial line of the tube has a small deviation off a straight line. If a green quartz glass tube as produced according to the method is ground to manufacture a primary quartz tube with a grinder of high precision and further processed thermally into tubes of various sizes, a quartz glass tube of high precision to be used as a preform for an optical fiber can be produced with a low cost.

EXAMPLES

Examples of the present invention will be described in detail. The details described in the examples are only for the purpose of illustration and do not restrict the scope of concepts of the present invention, unless specifically stated.

Example 1

A synthetic quartz glass rod was prepared by being thermally processed as a heat-resistant substrate 1 which is almost constantly tapered, having dimensions of the largest outer diameter D1 of 60 mm, the smallest outer diameter D2 of 55 mm, a total effective length of 2 m and an outer diameter ratio DD of 4.17%/m. The substrate 1 was horizontally supported and constantly moved back and forth along its axis while rotating about its axis.

A mother material body 3 made of porous quartz glass was produced on the substrate 1 by means of a chemical deposition while gaseous $S_iCl_4$ is hydrolyzed in oxygen-hydrogen flames generated from twenty burners in a row being arranged at a constant pitch of 10 cm opposite to the heat-resistant substrate 1. The mother material body 3 thus obtained has an outer diameter of about 390 mm, the length of a right circular cylinder portion of about 1.8m, a total weight of about 115 kg and an average density of 0.54 kg/cm$^3$. The mother material body 3 was cooled after completion of deposition and then dehydrated by heat-treating in a quartz glass pipe. The mother material body 3 was vertically set in a vacuum furnace with the large end positioned downwardly, then temperature of the mother material body was raised to 1,500° C. under vacuum, thereafter the mother material body was shifted downwardly in the furnace to be vitrified in a zone-melting technique (FIG. 1 (c)). The quartz glass body thus obtained with a large size had no displacement in the interface, despite the fact that no consideration was given to adhesion between the mother material body and the heat-resistant substrate. The diameter of the large quartz glass rod was about 200 mm. Through outer peripheral grinding, the green quartz glass rod was shaped into a quartz glass rod of an outer diameter of 195 mm, a length of 1.8 m and a weight of 115 kg with a maximal grinding loss of 2.6% and a maximum of a total loss of 8.9%.

Example 2

A heat-resistant substrate 1 was produced by grinding a large-sized synthetic quartz glass body to give a constant taper along the entire length and thereafter finished by fire-polishing so that substrate 1 has a largest outer diameter D1 of 60 mm, a smallest outer diameter of 44 mm, and an outer diameter ratio of 27.8%/m. The heat-resistant substrate 1 was vertically set on a turntable with the large end positioned downwardly and rotated together with the turntable. Ten burners on each of opposing both sides, twenty burners in a plane, were arranged oppositely to the heat-resistant substrate 1, which while rotating is blown with SiCl$_4$ in oxygen-hydrogen flames as a first step. This produces an interim mother material body 3 made of porous quartz glass of an outer diameter of about 300 mm and a length of about 1.1 m. As a final step the interim mother material body was further deposited on the surface to grow a larger-sized mother material body with a maximal outer diameter of 545 mm. The final mother material body 3 was inserted in a stationary large-scale electric vacuum furnace with the larger outer diameter positioned downwardly, then moving a melt zone from the lowest end upwardly by continuously shifting a heat-zone of the furnace upwardly for vitrification along the entire length. After completion of vitrification, the quartz glass body had a little contraction in the direction of the length in a cooled condition, but no displacement in the interface was observed, which has an average outer diameter of about 260 mm and a weight of about 110 kg.

Example 3

A first graphite rod 1 as shown in FIG. 1 (a) was prepared having largest outer diameter D1 of 50 mm, a smallest diameter D2 of 46 mm, an effective length of 2 m and an outer diameter ratio DD of 4%/m. The first graphite rod 1 was set in a horizontal OVD apparatus to produce a mother material body made of porous quartz glass in a similar way to that in Example 1.

The mother material body 3 thus produced was 390 mm in outer diameter and about 1.8 m in length. The graphite rod 1 was extracted from the mother body 3 after cooling. The inner surface of a hole left after the graphite rod 1 was extracted was machined for removal of pollutants as well as dimensional adjustment and thereafter the mother material body was dehydrated by heating. After the dehydration, a heat-resistant body such as a second high-purity graphite rod which has the same geometry as the first graphite rod 2 was fittingly inserted in the hole of the mother material body 3 (FIG. 1 (b)). The mother material body 3 was vertically set in a vacuum furnace with the lower diameter side positioned downwardly together with the inserted graphite rod 2. A portion in the furnace was heated at 1,500° C. and the mother material body 3 was continuously shifted downwardly through the heated portion to effect a zone melting process for vitrification (FIG. 1 (c)). After the zone melting and following cooling, the heat-resistant body 2 was extracted to leave a large-sized quartz glass tube with an outer diameter of about 210 mm, an inner diameter of 50 mm and a weight of 118 kg. Neither bend nor torsion was found. The quartz glass tube, which is an intermediate, was machined to rectify geometrical dimensions by outer grinding and inner grinding to obtain a shape with an outer diameter of 206 mm, inner diameter of 52 mm, a length of 1.8 m, and a weight of 118 kg. The time for machining was about 30% of the time required conventionally. The machining loss was as small as 4.5% and the total loss was as small as 9.2%, the latter of which is much smaller than the conventional 43%.

Example 4

A tapered alumina tube 1 was prepared which had a largest outer diameter D1 of 100 mm, a smallest outer diameter D2 of 95 mm, and an outer diameter ratio DD of about 1.56%/m. The alumina tube 1 was vertically set on a turntable with the larger outer diameter side positioned downwardly, both ends were fixedly held, and thereafter the alumina tube 1 was rotated about its axis while continuously oscillating upwardly and downwardly. A mother material body 3 made of porous quartz glass produced by means of an outer deposition method had an outer diameter of about 375 mm and a length of 3.2 m. The alumina tube 1 was extracted out of the cooled mother material body 3, thereafter the mother material body 3 was treated with chlorine gas and hydrated then the inner surface of the hole was dimensionally adjusted or trimmed. A heat-resistant body 2 such as a high-purity graphite rod having almost the same taper and dimensions as the alumina rod 1 was fittingly inserted in the hole. The mother material body 3 was set vertically in a vacuum furnace with the larger end of the graphite rod positioned downward to effect zone melting for vitrification from the lowest end. After the vitrification and cooling, the heat-resistant body 2 was extracted. The green quartz glass tube then produced has an outer diameter of about 220 mm, a length of 3.2 m and a weight of about 203 kg and neither bend nor torsion were observed. Through outer grinding and inner grinding, the green quartz glass tube was dimensionally adjusted into a shape having an outer diameter of 215 mm, inner diameter of 102 mm and length of 3.1 m and a weight of 183 kg. The consumed time for the outer and inner grindings was as short as 25% of the conventional requirement and a machining loss was about 9.8%, which was much shorter than the conventional 38%.

Effect of the Invention

According to a production method of the present invention, a large-sized quartz glass rod or a large-sized quartz glass tube can be provided having an orderly shape which can be easily machined. When a quartz glass rod is dimensionally adjusted by grinding and sliced into plates, quartz glass plates with a high precision are produced. When the large-sized quartz glass tube is ground on inner and outer surfaces with high precision, a quartz glass tube with a high precision results. The yield in terms of quartz glass mass is high and therefore production costs are reduced. When such a high-precision large-sized quartz glass tube is thermally processed and then used in production of a preform for an optical fiber, a large-sized preform for an optical fiber can be produced in a shorter time and with a lower cost.

What is claimed is:

1. A method of producing a quartz glass body comprising the following steps:

providing an elongated substrate having a large diameter end, a small diameter end, a length between said ends in the range of 500 mm to 5000 mm, a central axis between said ends, and a substantially cylindrical outer surface concentric to said axis, said outer surface having a diameter in the range of 20 mm to 500 mm, said outer surface having a tapered shape with a substantially constant degree of taper along said length, forming a mother material body of porous quartz glass on said outer surface while rotating said substrate about its axis, and sintering said mother material body by heating said mother material body while holding the substrate with its axis vertical and the large diameter end downward;

wherein said substrate further comprises means for preventing displacement of the mother material body at said large diameter end.

2. A method of producing a quartz glass body comprising the following steps providing an elongated substrate having a large diameter end, a small diameter end, a length between said ends in the range of 500 mm to 5000 mm, a central axis between said ends, and a substantially cylindrical outer surface concentric to said axis, said outer surface having a diameter in the range of 20 mm to 500 mm, said outer surface having a tapered shape with a substantially constant degree of taper along said length, forming a mother material body of porous quartz glass on said outer surface while rotating said substrate about its axis, sintering said mother material body by heating said mother material body while holding the substrate with its axis vertical and the large diameter end downward, extracting the substrate from said mother material body, thereby forming a hole in said mother material body, inserting an elongated body into said hole, said body having an axis and a large diameter end, said body having a tapered shape substantially the same as the tapered shape of the substrate, and sintering said mother material body by heating said mother material body while holding the heat-resistant body with its axis vertical and the large diameter end downward.

3. A method as in claim 2 wherein said body has a taper of 0.1 mm/m or more, said taper being defined as change in said outer diameter per unit of length, and an outer diameter ratio of 0.50/m or less, said ratio being defined as (D1−D2)/(D1×L), where D1 is the diameter at the large diameter end, D2 is the diameter at the small diameter end, and L is the length.

4. A method as in claim 2 wherein, in said sintering, said mother material body is zone sintered successively from the lower end of the body and moving upward.

5. A method as in claim 2 wherein said body further comprises means for preventing displacement of the mother material body at said large diameter end.

* * * * *